(12) United States Patent
Hartmann et al.

(10) Patent No.: US 8,209,112 B2
(45) Date of Patent: Jun. 26, 2012

(54) METHOD AND DEVICE FOR OPERATING AN INTERNAL COMBUSTION ENGINE

(75) Inventors: Dirk Hartmann, Stuttgart (DE); Georg Mallebrein, Korntal-Muenchingen (DE); Nicolas Ide, Ludwigsburg (DE); Andreas Roth, Muehlacker-Lomersheim (DE); Lutz Reuschenbach, Stuttgart (DE); Frank Schiller, Tamm (DE); Markus Deissler, Neckarsulm (DE); Michael Drung, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 560 days.

(21) Appl. No.: 11/992,498

(22) PCT Filed: Sep. 29, 2006

(86) PCT No.: PCT/EP2006/066930
§ 371 (c)(1),
(2), (4) Date: Oct. 14, 2009

(87) PCT Pub. No.: WO2007/036576
PCT Pub. Date: Apr. 5, 2007

(65) Prior Publication Data
US 2010/0036580 A1    Feb. 11, 2010

(30) Foreign Application Priority Data
Sep. 30, 2005 (DE) .......................... 10 2005 047 446

(51) Int. Cl.
*G06F 19/00* (2011.01)
*G06F 17/40* (2006.01)
*F02D 45/00* (2006.01)

(52) U.S. Cl. .................. 701/114; 123/406.45; 123/347; 701/103; 702/187

(58) Field of Classification Search .......... 701/102–105, 701/110, 114, 115; 123/406.45, 347, 348; 73/114.26, 114.27, 114.32, 114.77, 114.79; 702/182, 183, 187
See application file for complete search history.

(56) References Cited

U.S. PATENT DOCUMENTS 5,349,932 A * 9/1994 Boverie et al. ................. 123/399
5,635,634 A    6/1997 Reuschenbach et al.
6,112,150 A * 8/2000 Irons et al. .................... 701/114
(Continued)

FOREIGN PATENT DOCUMENTS
DE    4325902    2/1995
(Continued)

OTHER PUBLICATIONS

International Search Report, PCT International Patent Application No. PCT/EP2006/066930, dated Jan. 19, 2007.

*Primary Examiner* — Willis Wolfe, Jr.
*Assistant Examiner* — Johnny Hoang
(74) *Attorney, Agent, or Firm* — Kenyon & Kenyon LLP

(57) ABSTRACT

A method and a device are provided for operating an internal combustion engine which allow for an improved diagnosis of the valve mechanism of cylinders of the internal combustion engine. For this purpose, a variable characteristic of a suction performance of a cylinder of the internal combustion engine is ascertained. The variable characteristic of the suction performance is ascertained as a function of the mass flow flowing into an intake manifold of the internal combustion engine and of a change of the intake manifold pressure during an intake phase of the cylinder.

13 Claims, 4 Drawing Sheets

U.S. PATENT DOCUMENTS

| | | |
|---|---|---|
| 6,422,202 B1 * | 7/2002 | Wild .............................. 123/399 |
| 6,439,196 B1 * | 8/2002 | Kalweit et al. ................. 123/399 |
| 6,681,729 B2 | 1/2004 | Gaessler et al. |
| 6,705,276 B1 * | 3/2004 | Sun et al. ....................... 123/295 |
| 6,907,339 B2 * | 6/2005 | Henn ............................. 701/104 |
| 7,103,468 B2 * | 9/2006 | Wakashiro et al. ............ 701/110 |
| 2007/0157715 A1 * | 7/2007 | Boehm et al. ................. 73/118.2 |

FOREIGN PATENT DOCUMENTS

| | | |
|---|---|---|
| DE | 10064651 | 7/2002 |
| EP | 0 399 829 | 11/1990 |
| EP | 1247967 | 10/2002 |
| EP | 1 643 101 | 4/2006 |
| JP | 2002-227666 | 8/2002 |
| JP | 2004-36610 | 2/2004 |

* cited by examiner

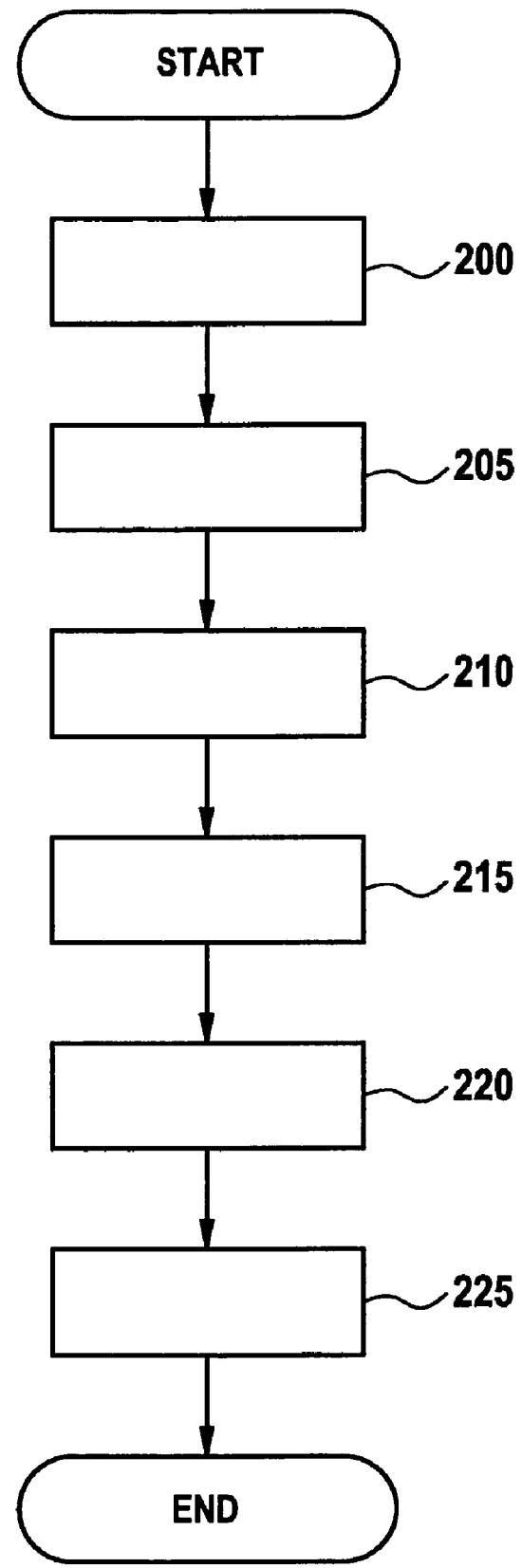

METHOD AND DEVICE FOR OPERATING AN INTERNAL COMBUSTION ENGINE

FIELD OF THE INVENTION

The present invention relates to a method and a device for operating an internal combustion engine.

BACKGROUND INFORMATION

A method and a device for controlling a gas charge of a plurality of cylinders in an internal combustion engine having a variable valve control, in which a detection signal of a charge sensor is sampled using a sampling rate, are described in German Patent No. DE 10064651 A1. Furthermore, a detection interval is determined for a cylinder. Within this detection interval, the sampling values are added up to ascertain a sampling value sum. Furthermore, a number of sampling values, which are within the first detection interval, is counted for ascertaining a first count value. The air mass filled into the first cylinder is then ascertained by forming a quotient from the sampling value sum and the count value. When the ratio between the intake manifold pressure and the ambient pressure is greater than 0.8, gas charge deviations between the cylinders are preferably detected using a hot film air mass sensor. When the throttling is increased, i.e., when the ratio between the intake manifold pressure and the ambient pressure is smaller than 0.8, then the detection signal of the intake manifold pressure sensor is preferably to be used for detecting gas charge deviations between cylinders.

SUMMARY

An example method according to the present invention and an example device according to the present invention for operating an internal combustion engine may have the advantage that the variable characteristic of the suction performance is ascertained as a function of a mass flow flowing into an intake manifold of the internal combustion engine and a change of the intake manifold pressure is ascertained during an intake phase of the cylinder. In this manner it is possible to implement a unified model for ascertaining the variable characteristic of the suction performance of the cylinder, which allows for the variable characteristic of the suction performance in all possible throttle valve positions and in all loads and engine speeds of the internal combustion engine. In this context, the variable characteristic of the suction performance may be determined precisely on the basis of a physical model of the intake manifold and a physical model of the discharge of the gas flow from the intake manifold into the cylinder having a charge sensor system.

It may be particularly advantageous if the intake manifold pressure is ascertained by sampling using a first specified sampling rate in a first time or crank angle interval specified in its length and position. In this manner, with a suitable choice of the length and position of the specified time or crank angle interval, it is a simple matter to ascertain the intake manifold pressure in correlation to the respectively aspirating cylinder.

It may be furthermore advantageous if multiple values for the intake manifold pressure of the first specified time or crank angle interval are averaged, in particular in a weighted manner. In this manner it is also sufficient to take samples for the intake manifold pressure from the first specified time or crank angle interval and to form from these a representative value for the intake manifold pressure in the first specified time or crank angle interval, it being possible, if the samples are weighted, to take into account in a particularly simple manner a varying significance of the samples for the characteristic curve of the intake manifold pressure in the first specified time or crank angle interval.

Another advantage may be obtained if the mass flow flowing into the intake manifold is ascertained, preferably by sampling using a second specified sampling rate, in a second time or crank angle interval specified in terms of its length and position. In this manner, with a suitable choice of the second time or crank angle interval specified in terms of its length and position, the mass flow flowing into the intake manifold may be ascertained in a particularly simple and reliable manner in correlation to the respective currently aspirating cylinder.

The same is true in the event that the mass flow flowing into the intake manifold is modeled or calculated from performance characteristics of the internal combustion engine in a specified computing grid in a second time or crank angle interval specified in terms of its length and position.

It is furthermore advantageous if multiple values for the mass flow of the second specified time or crank angle interval are averaged, in particular in a weighted manner. In this manner it suffices to take individual samples for the mass flow from the second specified time or crank angle interval, which are representative for the characteristic curve of the mass flow in the second specified time or crank angle interval. In the event of a varying significance of the individual samples for the characteristic curve of the mass flow in the second specified time or crank angle interval, these samples may also be averaged in a weighted manner.

Another advantage may be obtained if the second time or crank angle interval is offset with respect to the first time or crank angle interval by a specified time or crank angle span, preferably by one half of an ignition interval of two cylinders of the internal combustion engine that are fired directly in succession, in particular in time at least partly prior to the first time or crank angle interval. In this manner, the physical connection between the mass flow flowing into the intake manifold and the intake manifold pressure formed there for the respective currently aspirating cylinder may be taken into account in an optimal manner for ascertaining the variable characteristic of the suction performance of the cylinder.

Another advantage may be obtained if a value resulting for the characteristic variable is compared to a setpoint value and if as a function of the result of the comparison the functioning of the suction of the cylinder is diagnosed. In this manner it is possible to check in a particularly simple manner with the aid of the variable characteristic of the suction performance of the cylinder whether or not the suction of the cylinder is error-free.

Another advantage may be obtained if the variable characteristic of the suction performance is made to follow a setpoint value, in particular by controlling at least one gas exchange valve of the cylinder. In this manner, a cylinder-specific charge control may be implemented in a particularly simple manner.

Another advantage may be obtained if the variable characteristic of the suction performance is ascertained for multiple cylinders and if values of multiple cylinders resulting for the characteristic variable are compared to one another and if as a function of the result of the comparison the functioning of the suction of the cylinders is diagnosed. In this manner it is also possible to detect the deviations in the suction performance of different cylinders of the internal combustion engine and to diagnose an underlying malfunction of the valve control.

A particularly simple ascertainment of the variable characteristic of the suction performance is obtained if, as a first variable characteristic of the suction performance, a charge flowing off into the cylinder is selected that is ascertained as the sum of a charge flowing into the intake manifold of the last second specified time or crank angle interval and the quotient of the difference between the intake manifold pressures of the last two first specified time or crank angle intervals and a constant. In this manner it is possible to ascertain the first variable characteristic of the suction performance in a particularly simple and reliable manner with the aid of an existing charge sensor system.

On this basis, a second variable characteristic of the suction performance may be ascertained as the quotient of the first characteristic variable and a difference between the intake manifold pressure and a partial pressure of the last first time or crank angle interval that is a function of the residual gas in the cylinder. In this manner, the second variable characteristic of the suction performance is independent of the intake manifold pressure. Thus, a multiplicative variable results for the cylinder of the internal combustion engine, which characterizes the suction performance.

Another advantage may be obtained if a third variable characteristic of the suction performance is formed as the quotient of the second characteristic variable and an expected value. This again results in a multiplicative variable characterizing the suction performance of the cylinder, which in addition is also independent of the temperature of the intake air and the position of the intake camshaft.

Another advantage may be obtained if the intake manifold pressure is modeled by integrating the difference between a charge flowing into the intake manifold and a charge flowing off into the cylinder, if the thus modeled intake manifold pressure is compared to a measured intake manifold pressure and if the utilized variable characteristic of the suction performance is selected with the aid of a charge exchange model for determining the charge flowing off into the cylinder as a function of the modeled intake manifold pressure in such a way that the modeled intake manifold pressure is adapted to the measured intake manifold pressure. In this manner it is possible to implement an adaptation of the variable characteristic of the suction performance of the cylinder.

BRIEF DESCRIPTION OF THE DRAWINGS

An exemplary embodiment of the present invention is shown in the drawings and explained in greater detail below.

FIG. 4 shows a flow chart for an exemplary sequence of the method according to the present invention.

DETAILED DESCRIPTION OF EXAMPLE EMBODIMENTS

Figure 1:
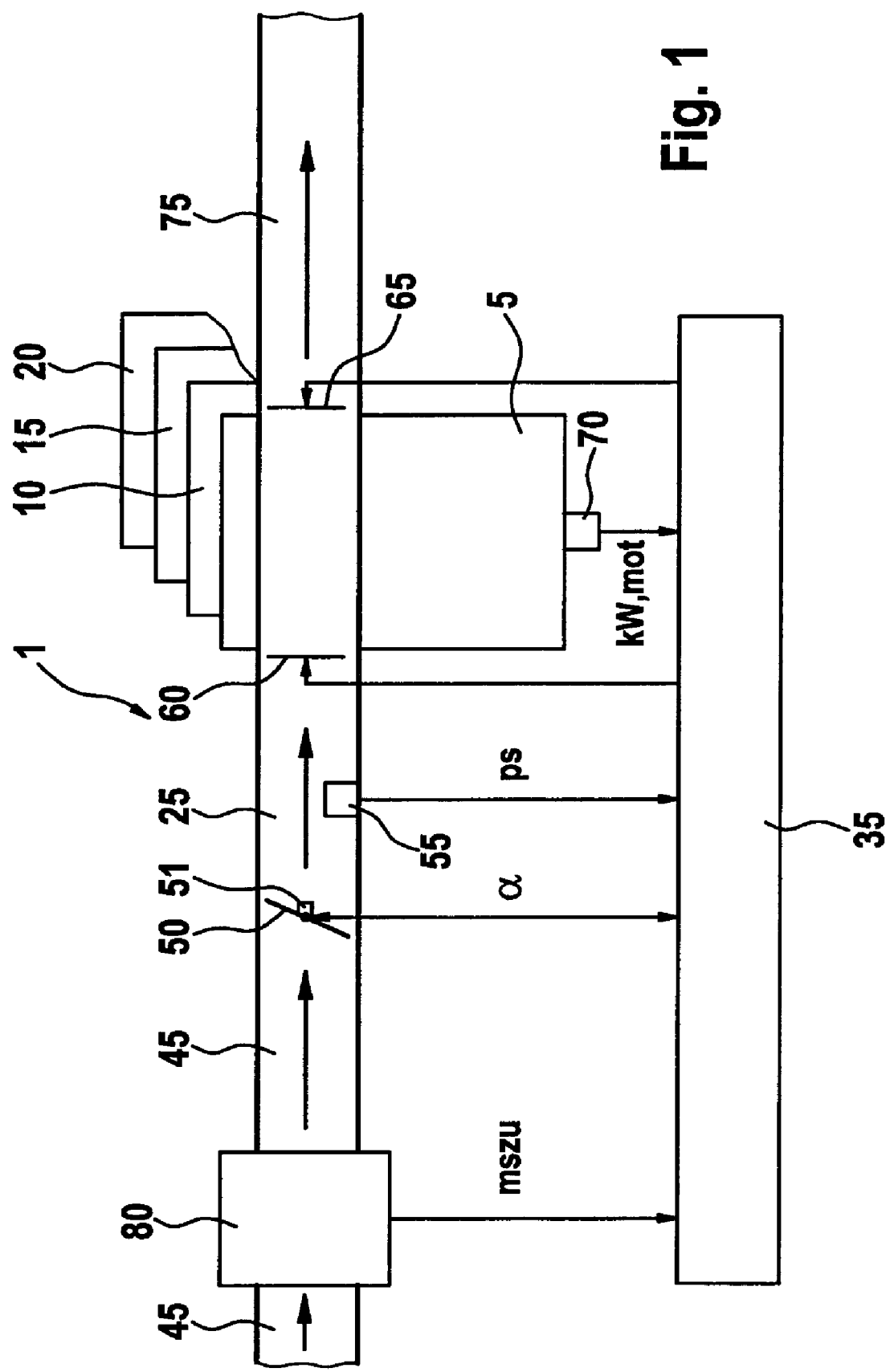
FIG. 1 shows a block diagram of an internal combustion engine.

In FIG. 1, 1 designates an internal combustion engine, which takes the form of an Otto engine for example. Internal combustion engine 1 drives a motor vehicle for example. In the example shown in FIG. 1, it includes four cylinders 5, 10, 15, 20, of which a first cylinder 5 is shown in exemplary fashion. Air is supplied to first cylinder 5 via an air supply 45, which downstream of a throttle valve 50 in air supply 45 turns into an intake manifold 25, and via an intake valve 60. Furthermore, fuel is injected into intake manifold 25 or directly into cylinder 5. The air/fuel mixture present in cylinder 5 is ignited by a spark plug, which is likewise not shown in FIG. 1. The subsequent combustion process drives a piston (not shown in FIG. 1) of first cylinder 5, which in turn drives a crankshaft of internal combustion engine 1. The exhaust gas produced in the combustion of the air/fuel mixture is discharged via an exhaust valve 65 of first cylinder 5 into an exhaust branch 75 of internal combustion engine 1. The opening and closing times of intake valve 60 and of exhaust valve 65 are controlled either by a common camshaft or by a separate intake camshaft and a separate exhaust camshaft or, as shown in FIG. 1, directly by an engine control unit 35 using a variable valve control. A crank angle sensor 70 situated in the region of cylinders 5, 10, 15, 20 ascertains the current crank angle of internal combustion engine 1 and relays it to engine control unit 35. Downstream from throttle valve 50, an intake manifold pressure sensor 55 is situated in intake manifold 25, which measures the current value of the intake manifold pressure and relays it to engine control unit 35. In a manner known to one skilled in the art, throttle valve 50 is controlled in its position by engine control unit 35 as a function, for example, of a driver input or an external control system such as, for example, a traction control system, an antilock system, a vehicle speed controller, a driving dynamics controller or the like and returns to engine control unit 35 a position feedback regarding the current position of throttle valve 50, for example with the aid of a potentiometer. An air mass meter 80, for example in the form of a hot film air mass meter, is situated in air supply 45, which measures the air mass flow mszu flowing into intake manifold 25 and relays the measured value to engine control unit 35. The position value reported back from throttle valve 50 exist for example in the form of the throttle valve angle α. The intake manifold pressure ascertained by intake manifold pressure sensor 55 is indicated in FIG. 1 by ps. In FIG. 1, the crank angle value supplied by crank angle sensor 70 is indicated by KW, and the engine speed derived from it by differentiation is indicated by nmot. The other cylinders 10, 15, 20 operate in the manner described with respect to first cylinder 5.

The example method and the example device described in the following allow for ascertaining a variable characteristic of the suction performance of the individual cylinders 5, 10, 15, connected to common intake manifold 25. Suction performance is here understood as a variable typical of the charge exchange process, which is characteristic of the fresh gas or air mass aspirated in the intake stroke of the respective cylinder 5, 10, 15, 20. The suction performance is influenced by the following variables:

the displacement of the respective cylinder 5, 10, 15, 20 the temperature of the gas flowing into the respective cylinder 5, 10, 15, 20 the phase angle and the lift of the valve lifting curve of the intake valve or intake valves of the respective cylinder 5, 10, 15, 20 and the tightness of the respective cylinder 5, 10, 15, 20, in particular with respect to the intake and exhaust valves and the piston rings.

The residual gas mass present in the respective cylinder 5, 10, 15, 20, which is characterized for example by the partial pressure point of the residual gas, influences the suction performance as well. In this example, the residual gas mass and thus the partial pressure point of the residual gas is definitely specified, however, so that for each cylinder 5, 10, 15, 20 it is necessary to detect only one factor and not additionally an offset.

Ascertaining suction performance varying with respect to individual cylinders is of particular interest for internal combustion engines having more than one cylinder. This is required, among other things, also for the diagnosis of valve control systems that switch the lift of intake valves or even switch off entire cylinders. If internal combustion engine 1 has a suitable continuous control mechanism for influencing the suction performance in a cylinder-specific manner, in particular for controlling the intake and exhaust valves in a cylinder-specific manner, then it is also possible to implement a cylinder-specific charge control by ascertaining the variable characteristic of the suction performance of the respective cylinder 5, 10, 15, 20.

For this purpose, according to the present invention, the variable characteristic of the suction performance of the respective cylinder 5, 10, 15, 20 is ascertained as a function of the gas mass flow flowing into intake manifold 25 and the characteristic curve of the intake manifold pressure in common intake manifold 25. For this purpose, it must be possible to correlate individual cylinders 5, 10, 15, 20 and the ascertained values characteristic of the suction performance.

According to the present invention, an intake manifold model and a charge exchange model are used for ascertaining the value characteristic of the suction performance and in particular its cylinder-specific variations using the existing charge sensor system described above, that is, air mass meter 80 and intake manifold pressure sensor 55. The use of intake manifold pressure sensor 55 is a prerequisite for the method according to the present invention and the device according to the present invention. Air mass meter 80 is advantageously provided, but its existence is not essential. As an alternative to the main load signal mszu of air mass meter 80 in the form of the air mass flow flowing to intake manifold 25, it is also possible to evaluate as a secondary load signal the signal α of the throttle valve angle sensor developed in this example as a potentiometer, which is shown in FIG. 1 by reference numeral 51. For this purpose, the air mass flow mszu supplied to intake manifold 25 is calculated in a conventional manner from throttle valve angle α and other performance characteristics of internal combustion engine 1 such as, for example, temperature T upstream from throttle valve 50 and the pressure ratio across throttle valve 50. The pressure ratio across throttle valve 50 is obtained as ps/pu, where pu is the ambient pressure. The corresponding performance quantities T,pu may be either detected by a suitable sensor system or may be modeled from other performance characteristics of internal combustion engine 1 in a conventional manner.

Thus, for example, an intake air temperature sensor may be provided in air supply 45 upstream from throttle valve 50 for ascertaining the gas temperature upstream from throttle valve 50. Furthermore, an ambient pressure sensor may likewise be provided upstream from throttle valve 50 for ascertaining the ambient pressure in air supply 45.

The measured intake air temperature is supplied to engine control unit 35. The measured ambient pressure is likewise supplied to engine control unit 35. Engine control unit 35 then ascertains the air or gas mass flow mszu supplied to intake manifold 25 from throttle valve angle α, pressure ratio ps/pu across throttle valve 50, and gas temperature T upstream from throttle valve 50 in a conventional manner and as described.

Intake manifold pressure sensor 55 samples the intake manifold pressure at a first specified sampling rate in a first time or crank angle interval specified in terms of its length and position. Subsequently, the sampled intake manifold pressure values are transformed into a rotational speed-synchronous computing grid. The transformation occurs by averaging the sampled intake manifold pressure values over the time or crank angle interval specified in its relative position and length. The averaging is performed preferably by summing up the sampled intake manifold pressure values in a temporally specified grid, for example 1 ms, and by dividing the thus obtained sum by the number of grids per first specified time or crank angle interval. The correlation between the time interval and the associated crank angle interval is produced via the current engine speed nmot in a conventional manner. The averaging is performed alternatively by summing up only individual samples at an arbitrary position of the first specified time or crank angle interval and by dividing the obtained sum by the number of samples taken. For this purpose, the samples may be taken at positions of the first specified time or crank angle interval that are considered to be particularly representative for the time characteristic of the intake manifold pressure in the first specified time or crank angle interval. In order to take into account a varying significance of individual samples when averaging, these may also enter the average for the intake manifold pressure in the associated first specified time or crank angle interval in a weighted manner.

Accordingly, mass flow mszu flowing into intake manifold 25 may also be ascertained by air mass meter 80 by sampling using a second specified sampling rate in a second time or crank angle interval specified in terms of its length and position. For this purpose, the second specified sampling rate may be advantageously selected in accordance with the first specified sampling rate. The first specified sampling rate, however, may also be selected to be different from the second specified sampling rate. Alternatively, the mass flow flowing into intake manifold 26 is modeled or calculated in the manner described in a specified computing grid, for example in grids of 1 ms in the second time or crank angle interval specified in its length and position from the performance characteristics of throttle valve angle α, temperature T upstream from throttle valve 50, and pressure ratio ps/pu across throttle valve 50. Independently of the manner in which the mass flow mszu flowing into intake manifold 25 is determined from the main load signal or the secondary load signal, the transformation of the sampling or computational values for the mass flow mszu flowing into intake manifold 25 into a rotational speed-synchronous computing grid occurs as described in that the sampling or computational values for air mass flow mszu are averaged over the second specified time or crank angle interval. This averaging occurs in turn by summing up the measured values in the described computing grid of 1 ms for example and by dividing the formed sum by the number of computing grids per second specified time or crank angle interval. Alternatively, individual samples may again be ascertained at arbitrary positions of the second specified time or crank angle interval for the air mass flow mszu flowing into intake manifold 25 and added up in order subsequently to form an average value by division by the number of samples. For this purpose, the samples may be taken advantageously in positions of the second specified time or crank angle interval that are of greater significance for the characteristic curve of air mass flow mszu in the second specified time or crank angle interval, it also being possible for the samples to be averaged in a variously weighted manner depending on the significance of the selected positions for taking the samples.

In a four-stroke engine, a value is selected as the reference value for the length of the first or of the second specified crank angle interval, which may be described by the following equation:

$$\text{Phi\_length} = 720° \text{ KW/number of cylinders} \tag{1}$$

Phi_length corresponds to the length of the first or second specified crank angle interval, KW signifies the crank angle, and the number of cylinders is the number of cylinders of internal combustion engine 1, the number of cylinders in the present example being=4.

Shorter or longer first or second specified crank angle intervals may be selected as well, however.

According to equation (1), the first or second specified crank angle intervals decrease with an increasing number of cylinders. The important point is that the first and the second specified crank angle interval may be assigned to the intake phase of the cylinder considered for ascertaining the value characteristic of the suction performance.

Figure 2:
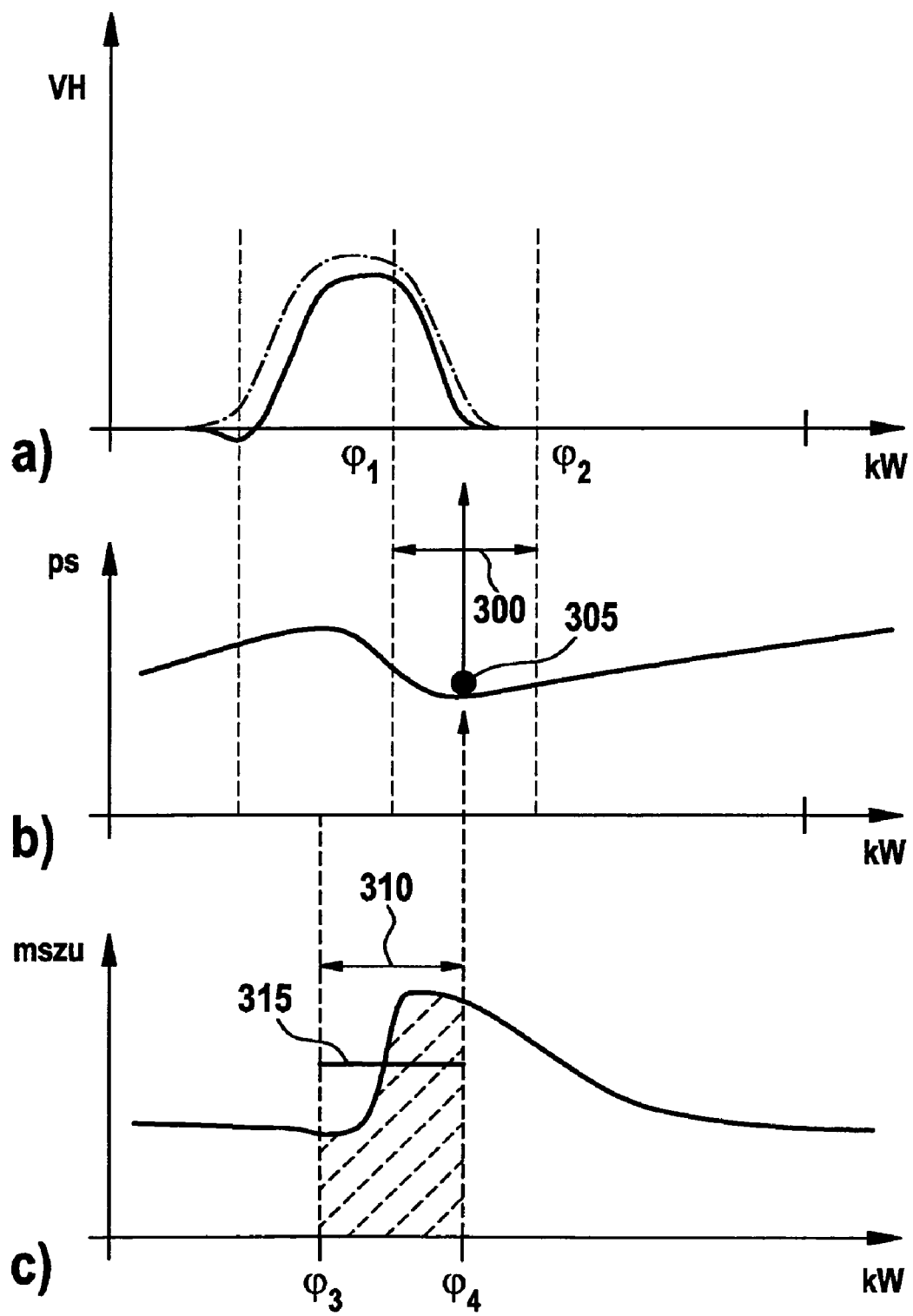
FIG. 2a) shows a diagram of a valve lift plotted against the crank angle.
FIG. 2b) shows a diagram of an intake manifold pressure plotted against the crank angle.
FIG. 2c) shows a diagram of a mass flow flowing into the intake manifold plotted against the crank angle.

For ascertaining the intake manifold pressure, the phase angle of the first specified crank angle interval may be adapted as a function of the installed position of intake manifold pressure sensor 55 in intake manifold 25 and especially as a function of engine speed nmot and other parameters such as, for example, the average value of intake manifold pressure ps. A proven favorable value for averaging intake manifold pressure ps is obtained when the first specified crank angle interval lies approximately in the middle around the time "intake closes" of the respective cylinder. This situation is illustrated in FIG. 2a) and FIG. 2b). FIG. 2a) shows the characteristic curve of valve lift VH of the intake valve of one of cylinders 5, 10, 15, 20 of internal combustion engine 1 plotted against crank angle KW. The characteristic curve of the valve lift is represented by a dash-dot line, which has for comparison the characteristic curve of the air mass flow to the respective cylinder superimposed as a solid line. The middle of first specified crank angle interval 300 is set approximately at crank angle KW, at which valve lift VH and with it the mass flow flowing to the respective cylinder starting from its maximum value again reaches the value 0. It begins at a first crank angle $\phi 1$ before "intake closes" and ends at a second crank angle $\phi 2$ after "intake closes". According to the characteristic curve of intake manifold pressure ps against crank angle KW as shown in FIG. 2b), the value of intake manifold pressure ps in the middle of the first specified crank angle interval corresponds approximately to the average value of the characteristic curve of the intake manifold pressure ps against crank angle KW in the first specified crank angle interval.

The average value of the intake manifold pressure ps in the first specified crank angle interval 300 is indicated in FIG. 2b) by reference numeral 305.

For detecting the mass flow, the second specified crank angle interval for averaging air mass flow mszu may deviate in its length and phase from the first specified crank angle interval for averaging intake manifold pressure ps. Since in the first specified crank angle interval the induction of gas from intake manifold 25 is detected, the averaging of air mass flow mszu should ideally occur in a second specified crank angle interval that is offset by a specified crank angle span with respect to the first specified crank angle interval. In this instance, the second specified crank angle interval is advantageously shifted in the advance direction with respect to the first specified crank angle interval, preferably by one half of an ignition interval of two cylinders that are fired in direct succession. The first specified crank angle interval and the second specified crank angle interval may also overlap each other or, alternatively, may not have a common intersection.

Such a phase shift of the specified crank angle intervals for averaging across intake manifold pressure ps and air mass flow mszu takes into account the fact that air mass flow mszu into intake manifold 25 during the second specified crank angle interval yields as the final value the ascertained and in particular averaged intake manifold pressure in the first specified crank angle interval. The signals of intake manifold pressure ps and air mass flow mszu thus averaged in the intake phase of the respective cylinder over the corresponding crank angle intervals are clearly associated with this cylinder.

FIG. 2c) shows the air mass flow mszu flowing into the intake manifold plotted against crank angle KW. In this instance, second specified crank angle interval 310 from a third crank angle $\phi 3$ to a fourth crank angle $\phi 4$ is shifted in the advance direction by the described half of an ignition interval with respect to first specified crank angle interval 300 and overlaps with first specified crank angle interval 300. Thus second specified crank angle interval 310 covers the characteristic curve of valve lift VH at maximum valve lift, at which the associated aspirating cylinder has the greatest suction performance, such that in second specified crank angle interval 310 a sharp rise of air mass flow mszu against crank angle KW is registered and its average over second specified crank angle interval 310 is indicated by reference numeral 315.

As shown in FIG. 2c), second specified crank angle interval 310 is selected in such a way that fourth crank angle $\phi 4$ lies approximately in the middle of first specified crank angle interval 300. The selection of the two specified crank angle intervals 300, 310 is based on the assumption that between third crank angle $\phi 3$ and second crank angle $\phi 2$ only the cylinder associated with the valve lift curve shown in FIG. 2a) aspirates, while the other cylinders of the internal combustion engine are not aspirating.

Now the differential equation of intake manifold 25 may be set up as follows:

$$ps = \frac{\int (mszu - msab) \cdot dt}{volume_{intake\ manifold} \cdot density_{gas}} \quad (2)$$

Equation (2) thus represents the intake manifold model. To implement this integral equation (2) in engine control unit 35, it may be executed by a simple computing rule in a synchronous computing grid. The calculation in a synchronous computing grid, i.e., once per aspiration of a cylinder, has the consequence that the calculation is performed, not on mass flows, but on charges. rlab denotes the fresh air charge in the combustion chamber of the respective cylinder which results during the intake phase of the cylinder when air mass flow msab flows into the combustion chamber of the respective cylinder. msab in equation (2) is thus the air mass flow that flows into the combustion chamber of the cylinder during its intake phase. Volume$_{intake\ manifold}$ is the volume of intake manifold 25 and density$_{gas}$ is the density of the fresh gas contained in the intake manifold. rlzu in turn is the fresh air charge that enters into intake manifold 25 during the intake phase of the respective cylinder when air mass flow mszu flows to intake manifold 25. rlzu is a standardized charge, assuming values between 0 and 100%, and resulting from the following equation:

$$rlzu = \frac{mszu \cdot}{nmot \cdot KUMSRL} \quad (3)$$

In equation (3), KUMSRL is a constant, dependent on the number of cylinders and the displacement, for converting between mass flow and charge and may be applied in a manner known to one skilled in the art on a test stand, for example, or may be calculated from the displacement and the number of cylinders of the engine.

The integral equation (2) of intake manifold 25 may now be written as a sum equation with charges in the synchronous computing grid:

$$ps(n)=ps(n-1)+K_{intake}[rlzu(n)-rlab(n)] \quad (4)$$

Equation (4) means that intake manifold pressure ps(n) ascertained for computing grid n results from intake manifold pressure ps(n−1) ascertained for computing grid n−1 plus the difference between charge rlzu(n) flowing into intake manifold 25 in computing grid n and charge rlab(n) flowing out of intake manifold 25 into the respective cylinder in computing grid 1 multiplied by a constant $K_{intake}$. Constant $K_{intake}$ is a function of the volume of the intake manifold and the temperature in the intake manifold and may be applied in a manner known to one skilled in the art on a test stand, for example, or may be obtained from the geometric dimensions of the intake manifold. Computing grid n−1 for the respective cylinder is earlier than computing grid n by exactly one synchronous computing grid, that is, it lies in the intake phase of the respective cylinder directly preceding the intake phase of this cylinder associated with computing grid n. Solving equation (4) for rlab(n) yields:

$$rlab(n)=rlzu(n)+(ps(n-1)-ps(n))/K_{intake} \quad (5)$$

In equation (5), ps(n−1) and ps(n) is respectively the measured variable for the intake manifold pressure averaged over the first specified crank angle interval. rlzu is the charge signal obtained via equation (3) from the measured or modeled air mass signal mszu, which represents an average value over the second specified crank angle interval.

In particular in the case of pressure ratios across throttle valve 50 of ps/pu<0.8, air mass flow mszu and thus charge rlzu may be ascertained with the aid of the secondary load signal, as described, i.e., calculated from a throttle valve model, throttle valve position a, intake manifold pressure ps, ambient pressure pu and temperature T upstream from throttle valve 50 then being taken into account in the manner described.

Charge rlab(n) aspirated into the respective cylinder in accordance with equation (5) represents a first variable characteristic of the suction performance of the respective cylinder. Generally, however, the variable rlab thus calculated is not yet the desired target variable. Rather, in general, a variable is to be calculated, which the suction performance of the respective cylinder be independent of the intake manifold pressure and optionally also independent of the temperature and the setpoint position of the camshaft. For this reason, in addition to the intake manifold model in accordance with equation (2), a charge exchange model is required as well. The charge exchange model describes the fresh air charge rlab inducted into the respective cylinder as a function of intake manifold pressure ps. As already described, there are also additive portions in the charge exchange model. These are combined by partial pressure pbrint of the residual gas. This additive portion, however, should not be calculated, but rather specified in a fixed manner. Thus, for each cylinder 5, 10, 15, 20, only a multiplicative variable, i.e., a factor describing the suction performance of the respective cylinder, needs to be determined. The charge exchange equation of the charge exchange model solved for the factor of the conversion from pressure into charge reads as follows:

$$fupsrl(n)=rlab(n)/[ps(n)-pbrint(n)] \quad (6)$$

Each of the variables specified in equation (6) again represents an average value over synchronous computing grid n or the corresponding first or second crank angle interval. In this instance, factor fupsrl(n) for converting pressure into charge represents a second value characteristic of the suction performance of the respective cylinder.

In order to obtain an independence from temperature T of the intake air, factor fupsrl(n) for converting pressure into charge may itself in turn be related to an expected value fupsrlsetpoint(n):

$$fupsrl(n)=fupsrlsetpoint(n) \text{ factor}_{fupstl} \quad (7)$$

Factor factor$_{fupstl}$ from equation (7), which is independent of intake manifold pressure and temperature, represents a third variable characteristic of the suction performance of the respective cylinder. The factual situation represented in equations (5) through (7) represents the central idea of the present invention:

A value characteristic of the cylinder-specific suction performance may be obtained from values of the current intake manifold pressure and the intake manifold pressure in the previous synchronous computing grid averaged over the first specified crank angle interval and from an air mass flow into intake manifold 25 averaged over the second specified crank angle interval, that is, as a function of the air mass flow flowing into intake manifold 25 of the internal combustion engine in the current intake phase and a change of the intake manifold pressure in the previous two consecutive intake phases of the respective cylinder. The method according to the present invention is represented in an exemplary manner in FIG. 4 in the form of a flow chart. Following the start of the program, at a first program point 200 during the first specified crank angle interval, engine control unit 35 detects the sampling values of intake manifold pressure sensor 55 and detects the sampling values of air mass meter 80 during the second specified crank angle interval. In the case of ascertaining air mass flow mszu from the secondary load signal, engine control unit 35 at program point 200 in the second specified crank angle interval ascertains the respective computational values for air mass flow mszu in the manner described. Subsequently, the program branches to a program point 205.

At program point 205, engine control unit 35 forms an average value of the sampled values for the intake manifold pressure or the obtained samples for the intake manifold pressure in the first specified crank angle interval. This average value is given by variable ps(n). Furthermore, at program point 205, engine control unit 35 ascertains the average value of the values for air mass flow mszu detected or calculated in the second specified crank angle interval or of the samples for air mass flow mszu formed in this second specified crank angle interval such that with the aid of equation (3) and the average value for engine speed nmot in the second specified crank angle interval and the applied constant KUMSRL the variable rlzu(n) for the charge supplied to intake manifold 25 is obtained. At program point 205, engine control unit 35 furthermore ascertains value ps(n−1) from the previous computing grid likewise as an average value of the intake manifold pressures formed in the previous intake phase of the respective cylinder in the respective first specified crank angle interval in the manner described. Subsequently, the program branches to a program point 210.

At program point 210, engine control unit 35 calculates in accordance with equation (5) the charge rlab(n) currently aspirated by the respective cylinder as an average value in the manner described. Subsequently, the first value characteristic of the suction performance of the respective cylinders is obtained such that the program may be terminated. Optionally, however, after program point 210, the program branches to a program point 215.

At program point 215, in accordance with equation (6), factor fupsrl(n) for converting pressure into charge is in turn calculated in the form of an average value and represents the second variable characteristic of the suction performance of the respective cylinder. Subsequently, the program may be terminated. Alternatively, however, the program may branch from program point 215 to a program point 220. At program point 220, in accordance with equation (7), factor factor$_{fupstl}$ is calculated as an average value and third variable characteristic of the suction performance of the respective cylinder. Subsequently the program is terminated.

Figure 3:
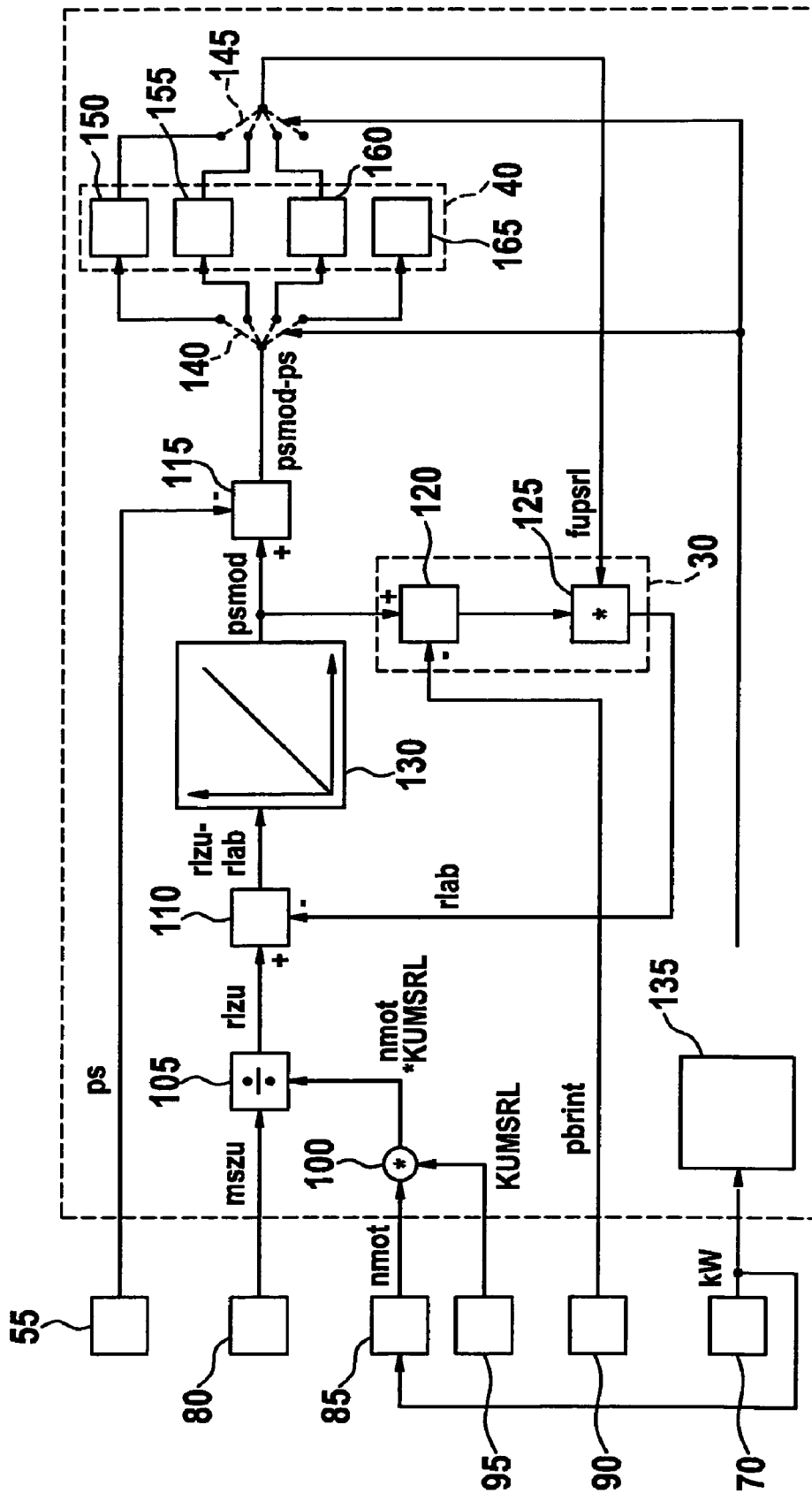
FIG. 3 shows a functional diagram for explaining the device according to the present invention and the method according to the present invention.

As an alternative to calculating the respective variable characteristic of the suction performance of the respective cylinder with the aid of equations (5)-(7), the variable characteristic of the cylinder-specific suction performance may also be learned by adaptation. In this case, the intake manifold and charge exchange model shown in FIG. 3 is implemented in the engine control unit in terms of software and/or hardware and is calculated during each intake process of a cylinder in a synchronous computing grid. The intake manifold model and the charge exchange model in this instance correspond exactly to equations (5)-(7), the only difference being the fact that in the adaptation the variable characteristic of the cylinder-specific suction performance is adapted by matching a modeled intake manifold pressure with the measured intake manifold pressure.

In FIG. 3, identical reference numerals denote the same elements as in FIG. 1. For the exemplary embodiment as shown in FIG. 3 it is assumed that air mass flow mszu is detected by air mass meter 80. The current crank angle values KW detected by crank angle sensor 70 are supplied to a differentiating element 85 that ascertains the time gradient of the crank angles detected by crank angle sensor 70 and supplies it as the engine speed nmot to a first multiplication element 100, which is also supplied by a factor value memory 95 with factor KUMSRL. The product nmot*KUMSRL obtained at the output of first multiplication element 100 is supplied as a divisor to a division element 105, which is also supplied by air mass meter 80 with the measured air mass flow mszu as dividend. Thus, the quotient rlzu=mszu/(nmot*KUMSRL) according to equation (3) is obtained at the output of division element 105. From this quotient, a first subtraction element 110 subtracts charge rlab flowing off into the respective cylinder, which is formed by a charge exchange model 30. Thus the difference rlzu−rlab is obtained at the output of first subtraction element 110. This is supplied as input variable to a first integrator 130, which represents the intake manifold model. Thus a modeled value for intake manifold pressure psmod is obtained at the output of first integrator 130. In a second subtraction element 115, the intake manifold pressure ps measured by intake manifold pressure sensor 55 is subsequently subtracted from the modeled value psmod of the intake manifold pressure. The resulting difference psmod−ps may be supplied via a first controlled switch 140, depending on the position of the switch, either to a second integrator 150, a third integrator 155, a fourth integrator 160 or a fifth integrator 165. For this purpose, second integrator 150 is associated with first cylinder 5, third integrator 155 with second cylinder 10, fourth integrator 160 with third cylinder 15 and fifth integrator 165 with fourth cylinder 20. The output signal of crank angle sensor 70 is also supplied to an evaluation unit 135 of engine control unit 35, which controls first controlled switch 140 to connect the output of first subtraction element 115 to second integrator 150 in the intake phase of first cylinder 5, to connect the output of first subtraction element 115 to third integrator 155 during the intake phase of second cylinder 10, to connect the output of second subtraction element 115 to fourth integrator 160 during the intake phase of third cylinder 15, and to connect the output of second subtraction element 115 to fifth integrator 165 during the intake phase of fourth cylinder 20. The outputs of integrators 150, 155, 160, 165 are able to be connected optionally to a second multiplication element 125 of charge exchange model 30 via a second controlled switch 160, which is switched by evaluation unit 135 synchronously with respect to first controlled switch 140. In this instance, the output of second integrator 150 is connected to second multiplication element 125 during the intake phase of first cylinder 5, the output of third integrator 155 to second multiplication element 125 during the intake phase of second cylinder 10, the output of fourth integrator 160 to second multiplication element 125 during the intake phase of third cylinder 15, and the output of fifth integrator 165 is connected to second multiplication element 125 in the intake phase of fourth cylinder 20. In this instance, the output of integrators 150, 155, 160, 165 represents factor fupsrl for converting pressure into charge. It is adapted by integrators 150, 155, 160, 165 in the sense of minimizing the difference psmod−ps. In a third subtraction element 120, the partial pressure pbrint of the residual gas from a residual gas value memory 90 is subtracted from modeled intake manifold pressure psmod on the output of first integrator 130. The resulting difference psmod−pbrint on the output of third subtraction element 120 is supplied to second multiplication element 125 and is there multiplied by factor fupsrl for converting pressure into charge such that at the output of second multiplication element 125 charge rlab is obtained, which is inducted into the respective cylinder and which is, as described, supplied to first subtraction element 110. In this instance, third subtraction element 120 and second multiplication element 125 form charge exchange model 30. Integrators 150, 155, 160, 165 form an ascertainment unit 40 for ascertaining a value characteristic of the suction performance of the individual cylinders, that is, a cylinder-specific suction performance in the form of factor fupsrl for converting pressure into charge. With the adaptation of factor fupsrl for converting pressure into charge, value rlab for the charge inducted in the respective cylinder is also adapted as the first value characteristic of the suction performance. As shown in FIG. 3, residual gas value memory 90 and factor value memory 95 as well as differentiating element 85 are situated outside of engine control unit 35, but may optionally and independently of each other also be implemented in engine control unit 35.

A refinement of the present invention optionally provides for the value resulting for the utilized first, second or third variable characteristic of the suction performance of a cylinder to be compared to a setpoint value and for the functioning of the suction of the respective cylinder to be diagnosed as a function of a result of the comparison. This may occur at a program point 225 following program point 220, as shown in FIG. 4, program point 225 being represented by a dashed line. The setpoint value may be applied on a test stand, for example. If the value resulting at program point 225 for the utilized characteristic variable agrees with the setpoint value within a specified tolerance range, likewise applied on a test stand, for example, then an error-free functioning of the suction of the respective cylinder is diagnosed, otherwise an error in the suction of the respective cylinder is diagnosed and an optical and/or acoustic warning message, if necessary an emergency operation of the internal combustion engine, or as a last resort a shutdown of the internal combustion engine is initiated. According to another optional specific embodiment of the present invention, the ascertained and utilized variable characteristic of the suction performance of the respective cylinder may also be used to perform a cylinder-specific charge control in which the utilized variable characteristic of the suction performance of the respective cylinder, which is ascertained in the manner described, is made to follow a specified setpoint value. In this case, the setpoint value may be ascertained, for example, as a function of a driver input or a requirement of an external control system such as for example a traction control, an antilock system, a vehicle dynamics control, a vehicle speed control or the like or may be applied as a fixed value on a test stand, for example. The cylinder-specific charge control may then be implemented for example by individually controlling at least one gas exchange valve of the respective cylinder, for example one or more intake valves and one or more exhaust valves of the respective cylinder. This is possible particularly in the case of a fully variable valve control in which in this manner cylinder-specific fluctuations of the suction performance are able to be detected and compensated or in which cylinder-specific setpoint charges are deliberately controlled in the manner described. A corresponding control step for the current intake phase of the respective cylinder is carried out at program point 225 as shown in FIG. 4. The program as shown in FIG. 4 is run through for each intake phase of the currently considered cylinder. Following program point 225, the program is terminated.

Another optional specific embodiment provides for the ascertained utilized variable characteristic of the suction performance to be ascertained for multiple cylinders, and for the values of multiple cylinders resulting for the variable characteristic of the suction performance to be compared to one another, and for the functioning of the suction of the cylinders to be diagnosed as a function of the result of the comparison. In this manner, a diagnosis of undesired cylinder-specific variations between the suction performances of individual cylinders may be diagnosed. A typical application is the diagnosis of valve mechanisms for switching off cylinders. Mistakenly switched-off or mistakenly active cylinders are immediately detected. Furthermore, a clear cylinder allocation may be made on the basis of the first and second crank angle intervals selected as described. Additional applications are conceivable in the case of valve mechanisms using lift changeover. The varying suction performances when using varying lift curves in different cylinders may be detected and may be compared to their setpoint values for diagnostic purposes. Valve control systems using phase control, where cylinder-specific variations may occur due to the construction, may also be diagnosed in this manner. In particular, variations in the suction performance of different cylinders in electromagnetic or electrohydraulic fully variable valve controls may be diagnosed in the manner described.

In the case of the described comparison of the values characteristic of the suction performances of multiple cylinders, variations in the suction performances of individual cylinders may also be rectified in that the values characteristic of the suction performances of the individual cylinders are controlled to match a common setpoint value in order thus to achieve an equalization of these cylinders with respect to the variable characteristic of the suction performance.

The diagnosis of an error in the cylinder-specific suction performance of a cylinder may be due to fact, for example, that the piston rings are not longer sufficiently tight such that the charge of the respective cylinder is reduced at low loads and engine speeds by the fact that gas from the crankcase impairs the inflow of fresh air via intake manifold 25. In this case, it is possible to use the cylinder-specific diagnosis of the suction performance to perform a compression diagnosis, in which the piston rings are checked for sufficient tightness.

The described diagnoses may be performed, for example, at the end of the assembly line following the manufacture of the internal combustion engine or of the vehicle or in a workshop or even while the internal combustion engine is in operation. In the process, particularly at the end of the assembly line, it is possible to check all possible variants of valve lift curves in their effect on the charge of the individual cylinders in the manner described for diagnostic purposes.

What is claimed is:

1. A method for operating an internal combustion engine, comprising:
    ascertaining a variable characteristic of a suction performance of a cylinder of the internal combustion engine as a function of a mass flow flowing into an intake manifold of the internal combustion engine;
    ascertaining a change of an intake manifold pressure during an intake phase of the cylinder; and
    comparing a value resulting for the characteristic variable to a setpoint value; and one of diagnosing, as a function of the result of the comparison, a functioning of a suction of the cylinder, or controlling at least one gas exchange valve of the cylinder to make the variable characteristic of the suction performance follow the setpoint value.

2. The method as recited in claim 1, wherein the intake manifold pressure is ascertained by sampling using a first specified sampling rate in a first time or crank angle interval specified in its length and position.

3. The method as recited in claim 2, wherein multiple values for the intake manifold pressure of the first specified time or crank angle interval are averaged in a weighted manner.

4. The method as recited in claim 2, wherein the mass flow flowing into the intake manifold is ascertained by sampling using a second specified sampling rate, in a second time or crank angle interval specified in terms of its length and position.

5. The method as recited in claim 2, wherein the mass flow flowing into the intake manifold is modeled or calculated from performance characteristics of the internal combustion engine in a specified computing grid in a second time or crank angle interval specified in terms of its length and position.

6. The method as recited in claim 4, wherein multiple values for the mass flow of the second specified time or crank angle interval are averaged in a weighted manner.

7. The method as recited in claim 4, wherein the second time or crank angle interval is offset with respect to the first time or crank angle interval by a specified time or crank angle span, by one half of an ignition interval of two cylinders of the internal combustion engine that are fired directly in succession in time at least partly prior to the first time or crank angle interval.

8. The method as recited in claim 1, wherein the characteristic variable is ascertained for multiple cylinders and values of multiple cylinders resulting for the characteristic variable are compared to one another and the functioning of the suction of the cylinders is diagnosed as a function of the result of the comparison.

9. The method as recited in claim 4, wherein as a first variable characteristic of the suction performance a charge flowing off into the cylinder is selected that is ascertained as a sum of a charge flowing into an induction manifold of the last second specified time or crank angle interval and a quotient of the difference between the intake manifold pressures of the last two first specified time or crank angle intervals and a constant.

10. The method as recited in claim 9, wherein a second variable characteristic of the suction performance is ascertained as a quotient of the first characteristic variable and a difference between the intake manifold pressure and a partial pressure of the last first time or crank angle interval that is a function of residual gas in the cylinder.

11. The method as recited in claim 10, wherein a third variable characteristic of the suction performance is formed as a quotient of the second characteristic variable and an expected value.

12. The method as recited in claim 1, wherein the intake manifold pressure is modeled by integrating a difference between a charge flowing into an intake manifold and a charge flowing off into the cylinder, the modeled intake manifold pressure is compared to a measured intake manifold pressure and the variable characteristic of the suction performance is selected using a charge exchange model for determining the charge flowing off into the cylinder as a function of the modeled intake manifold pressure in such a way that the modeled intake manifold pressure is adapted to the measured intake manifold pressure.

13. A device for operating an internal combustion engine, comprising:
- an ascertainment unit adapted to ascertain a variable characteristic of a suction performance of a cylinder of the internal combustion engine, the ascertainment unit ascertaining the variable characteristic of the suction performance as a function of a mass flow flowing into an intake manifold of the internal combustion engine and a change of an intake manifold pressure during an intake phase of the cylinder; and
- a component adapted to compare a value resulting for the characteristic variable to a setpoint value, and, as a function of the result of the comparison, diagnoses a functioning of a suction of the cylinder or makes the variable characteristic of the suction performance follow the setpoint value by controlling at least one gas exchange valve of the cylinder.

* * * * *